United States Patent [19]

Dourson et al.

[11] Patent Number: 5,195,619
[45] Date of Patent: Mar. 23, 1993

[54] INTERNAL ACCUMULATOR FOR A HYDRAULIC DAMPER

[75] Inventors: Stephen E. Dourson, Dayton; Wayne V. Fannin, Xenia, both of Ohio

[73] Assignee: General Motors Corporation, Detroit, Mich.

[21] Appl. No.: 754,098

[22] Filed: Sep. 3, 1991

[51] Int. Cl.⁵ .............................................. F16F 9/46
[52] U.S. Cl. .................................... 188/299; 188/282; 188/314; 188/315; 188/318; 188/269
[58] Field of Search ............... 188/314, 315, 269, 268, 188/279, 280, 281, 282, 297, 322.17, 298, 310, 311, 313, 316–319, 322.15, 322.22, 322.19, 299; 60/413; 267/64.15, 64.27, 64.23, 64.11, 140.1 AE, 140.1 C, 140.1 R; 303/87

[56] References Cited

U.S. PATENT DOCUMENTS

| | | | |
|---|---|---|---|
| 2,670,814 | 3/1954 | Ball | 188/315 |
| 3,042,154 | 7/1962 | Zeidler | 188/269 |
| 3,105,574 | 10/1963 | Hoffmann et al. | 188/298 X |
| 3,433,330 | 3/1969 | Murray | 303/87 |
| 3,469,661 | 9/1969 | Hoffmann et al. | 188/269 |
| 3,625,321 | 12/1971 | Lutz | 188/314 X |
| 3,782,710 | 1/1974 | Selke et al. | 267/64.11 X |
| 3,787,019 | 1/1974 | Freitag | 188/314 X |
| 3,891,199 | 6/1975 | Willich et al. | 188/315 X |
| 4,132,395 | 1/1979 | Fox, Jr. | 188/269 X |
| 4,174,098 | 11/1979 | Baker et al. | 188/315 X |
| 4,271,869 | 6/1981 | Weidl et al. | 188/269 X |
| 4,411,341 | 10/1983 | Schultz | 188/310 |
| 4,432,254 | 2/1984 | Schultz | 188/379 X |
| 4,532,856 | 8/1985 | Taylor | 188/322.17 |
| 4,614,255 | 9/1986 | Morita et al. | 188/314 X |
| 4,700,815 | 10/1987 | Persicke et al. | 188/269 X |
| 4,779,625 | 10/1988 | Cole | 303/87 X |
| 4,817,925 | 4/1989 | Sprang et al. | 267/140.1 A |
| 4,828,234 | 5/1989 | Hoying et al. | 267/140.1 AE |
| 4,880,086 | 11/1989 | Knecht et al. | 188/299 |
| 4,971,300 | 11/1990 | Ticks | 267/140.1 A |
| 4,997,009 | 3/1991 | Niikura et al. | 188/314 X |

FOREIGN PATENT DOCUMENTS

| | | | |
|---|---|---|---|
| 625137 | 8/1961 | Canada | 188/314 |
| 1245224 | 7/1967 | Fed. Rep. of Germany | 188/315 |
| 3435020 | 4/1985 | Fed. Rep. of Germany | 303/87 |
| 1060812 | 11/1951 | France | 188/314 |
| 1069537 | 1/1953 | France | 188/314 |
| 1113867 | 10/1954 | France | 188/314 |
| 1280076 | 11/1960 | France | 188/314 |
| 996180 | 6/1961 | United Kingdom | 188/314 |
| 2072302 | 9/1981 | United Kingdom | 188/269 |
| 2234041 | 1/1991 | United Kingdom | 188/318 |

Primary Examiner—Douglas C. Butler
Attorney, Agent, or Firm—A. Michael Tucker

[57] ABSTRACT

A hydraulic damper includes an internal accumulator for storing and dissipating energy resulting from a fluid pressure spike inside the damper. A housing is mounted on a piston rod above a reciprocable piston. A compressible medium is stored in the housing. A valve assembly controls the flow of fluid into and out of the accumulator. When a sudden fluid pressure rise occurs, the mediu.n compresses to store the energy. When the pressure rise dissipates, fluid exits the accumulator as the medium expands.

9 Claims, 1 Drawing Sheet

INTERNAL ACCUMULATOR FOR A HYDRAULIC DAMPER

BACKGROUND OF THE INVENTION

1. Field of the Invention

The present invention relates generally to hydraulic dampers for vehicular suspension. In particular, the present invention is concerned with an internal fluid accumulator and method to absorb and dissipate energy when a fluid pressure spike occurs inside a hydraulic damper.

2. Description of the Related Art

Hydraulic dampers (shock absorbers and struts) include a reciprocable piston and piston rod slidably mounted in a fluid-filled cylinder. The piston divides the interior of the cylinder into upper and lower chambers. A valve assembly in the piston provides a restricted fluid path between the chambers. A reservoir tube concentrically mounts and cooperates with the cylinder to form a fluid reservoir. The lower end of the cylinder is closed by a compression or base valve assembly. During a compression stroke, fluid travels from the lower chamber through the piston valve assembly to the upper chamber. The fluid equivalent of the rod volume is discharged through the base valve assembly to the reservoir. During a rebound stroke, fluid travels from the upper chamber through the piston valve assembly to the lower chamber. Also, fluid travels from the reservoir through the base valve assembly to the lower chamber to compensate for the rod volume. The restriction of fluid through the piston and base valve assemblies provides the level of damping in a damper.

The use of a bypass channel between the upper chamber and the reservoir is well-known in dampers. Many such dampers incorporate a quick-acting electric solenoid valve assembly to open and close the bypass channel. When the solenoid valve assembly is opened, fluid travels from the upper chamber to the reservoir through the bypass channel. This redirection of fluid changes the damping characteristic of the damper to a "soft" setting, since the bypass channel permits fluid flow with less restriction than the piston and base valve assemblies. When the solenoid valve assembly is closed, fluid is forced to flow through the piston and base valve assemblies in the usual manner, resulting in a "firm" setting.

As a damper reciprocates, fluid is forced through various passages. When this flowing fluid is quickly decelerated by closing the solenoid valve assembly, the change in fluid momentum causes a pressure spike or rise in the fluid upstream of the solenoid valve assembly. The pressure spike causes the piston to accelerate at high gravitational levels, thereby exciting body elements to which the piston rod is mounted and producing structural vibration and airborne noise over a wide band of audio frequencies.

The art continues to seek improvements. It is desirable to minimize the vibration and noise in body elements which can result from the closing of a solenoid valve assembly in a hydraulic damper.

SUMMARY OF THE INVENTION

The present invention includes an internal fluid accumulator for a hydraulic damper. The accumulator absorbs and dissipates energy from fluid pressure increases caused by the quick closure of a solenoid valve assembly in the damper. Absorption of such energy reduces piston rod acceleration, and ultimately minimizes vibration of and resulting noise from body elements attached to the piston rod.

In a preferred embodiment, a hydraulic damper includes an internal accumulator for storing and dissipating energy resulting from a fluid pressure spike inside the damper. A housing is mounted on a piston rod above a reciprocable piston. A compressible medium is stored in the housing. A valve assembly controls the flow of fluid into and out of the accumulator. When a sudden fluid pressure rise occurs, the medium compresses to store the energy. When the pressure rise dissipates, fluid exits the accumulator as the medium expands.

DETAILED DESCRIPTION OF THE PREFERRED EMBODIMENT

Figures 1, 2:
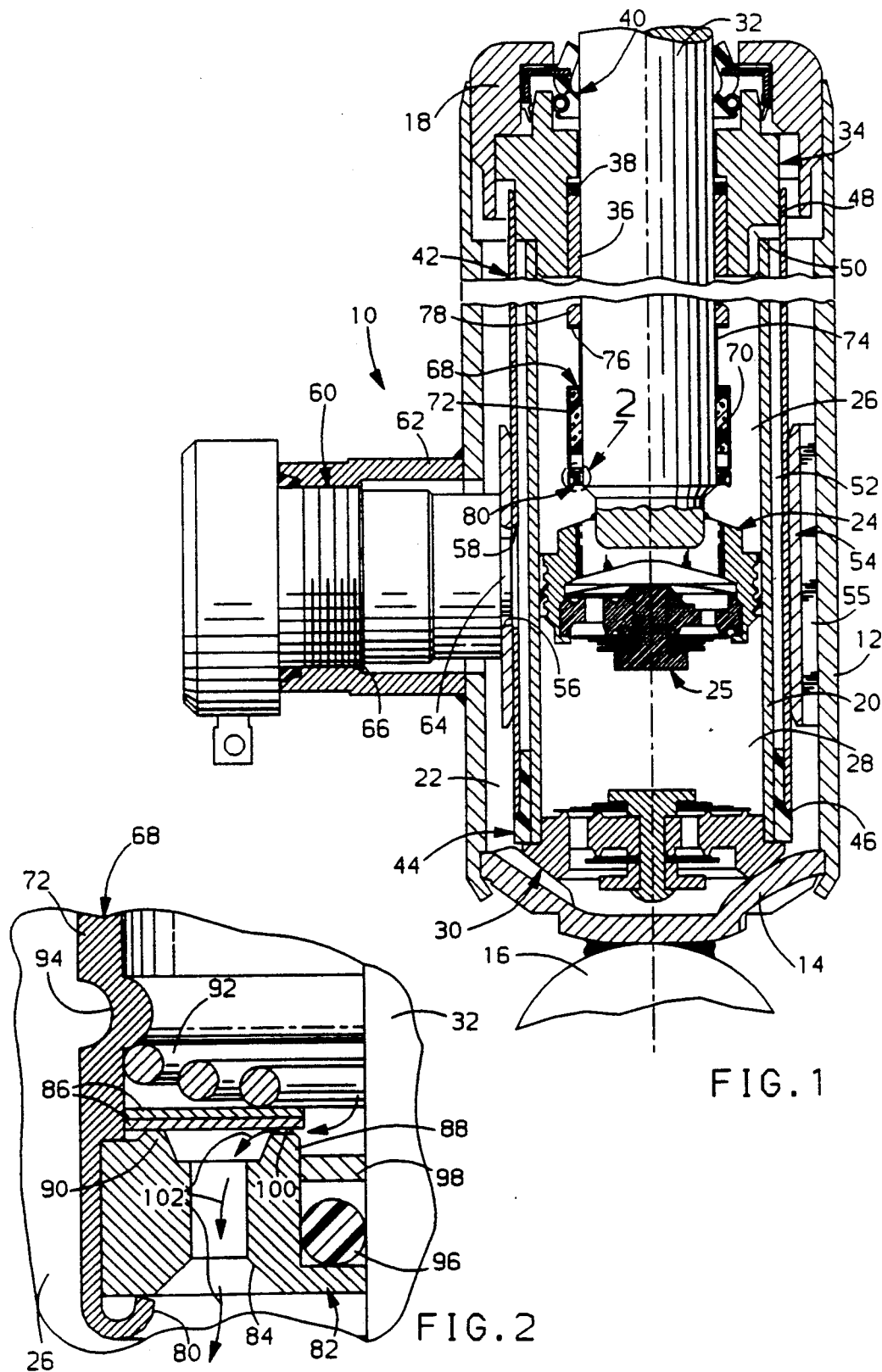
FIG. 1 is a longitudinal sectional view of a hydraulic damper including an internal fluid accumulator according to the present invention mounted on a piston rod.
FIG. 2 is a greatly enlarge view of the circled portion of the damper of FIG. 1 illustrating the return of fluid from the accumulator through a coined orifice seat.

A hydraulic damper is indicated generally at 10 in FIG. 1. The damper 10 includes an outer reservoir tube 12 closed at its lower end by an end cap 14. A mounting fitting 16 is provided on the end cap 14 for securing the damper 10 to a vehicular road wheel assembly (not illustrated) in a well-known manner. A seal cover 18 is welded or otherwise secured to the upper end of the reservoir tube 12.

A fluid-filled inner cylinder 20 is spaced inwardly from and concentric with the reservoir tube 12. The volume between the inner cylinder 20 and the reservoir tube 12 forms a fluid reservoir 22. A piston 24 is slidably mounted inside the inner cylinder 20 and divides the interior volume of the inner cylinder 20 into an upper chamber 26 and a lower chamber 28. The piston 24 includes well-known internal valving 25 which provides a restricted flow path between the lower chamber 28 to the upper chamber 26 as the piston 24 reciprocates in the inner cylinder 20. A well-known compression valve assembly 30 secured to and closing the lower end of the inner cylinder 20 controls the flow of fluid between the reservoir 22 and the lower chamber 28 during operation of the damper 10 as described below.

A piston rod 32 is attached at its inner end to the piston 24 and is connected at its upper end (not illustrated) to bodywork (not illustrated) of a vehicle in any conventional manner. The piston rod 32 passes through a rod guide 34 press fitted onto the upper end of the inner cylinder 20 and held in position by the seal cover 18. An annular bearing 36 is fitted into a central passage of the rod guide 34 and receives the piston rod 32. A high-pressure seal ring 38 is provided about the rod guide 34 adjacent the bearing 36. A low-pressure seal assembly 40 is seated on the rod guide 34 and has sealing contact with the piston rod 32 t prevent loss of hydraulic fluid from the damper 10 as the piston 24 strokes in the inner cylinder 20 during operation.

An intermediate tube 42 is concentrically mounted bout the inner cylinder 20. A tube seal adapter 44 preferably formed from a suitable polymeric material is press fitted onto a lower end of inner cylinder 20. A circumferential shoulder 46 of the adapter 44 receives a lower end of the intermediate tube 42. An upper end of the intermediate tube 42 is press fitted onto an intermediate diameter portion 48 of the rod guide 34.

A plurality of ports 50 (only one of which is illustrated in FIG. 1) are formed in the rod guide 34 to provide fluid communication between the upper chamber 26 and an annular bypass channel 52 formed by the volume between the inner cylinder 20 and the intermediate tube 42. The tube seal adapter 44 blocks the lower end of the bypass channel 52 and forms a fluid seal.

A sleeve 54 which can include longitudinal ribs 55 is press fitted onto the intermediate tube 42 and includes an opening 56 aligned with an opening 58 provided in the intermediate tube 42. Openings 56 and 58 provide fluid communication between the bypass channel 52 and a solenoid valve assembly 60 threaded into a valve boss 62 welded to the reservoir tube 12.

The solenoid valve assembly 60 includes an inlet portion 64 in communication with the bypass channel 52 and an annular outlet portion 66 in communication with the reservoir 22. When the solenoid valve assembly 60 is energized by a controller (not illustrated), an internal passage (not illustrated) is opened which permits the one-way passage of fluid from the inlet portion 64 to the outlet portion 66. When the solenoid valve assembly 60 is not energized, fluid flow is blocked through its internal passage. Thus, opening the solenoid valve assembly 60 changes the damping force provided by the damper 10 to a "soft" mode by routing fluid through the bypass channel 52 to the reservoir 22 instead of through the piston and compression valve assemblies 25, 30.

When the solenoid valve assembly 60 is opened, fluid flows through the bypass channel 52 under considerable pressure. The sudden closure of the solenoid valve assembly 60 results in a pressure spike or rise in the bypass channel 52 and the upper chamber 26. The pressure rise may cause acceleration of the piston 24 and piston rod 32 which can excite the body and associated elements of the vehicle, resulting in vibration and airborne noise over a wide band of audio frequencies. An internal fluid accumulator indicated generally at 68 is provided in the upper chamber 26 to absorb and dissipate the fluid pressure change caused by the closure of the solenoid valve assembly 60.

The accumulator 68 includes a compressible medium 70 having a high damping coefficient capable of both storing and dissipating energy. Various materials can be used for the medium 70 including closed-cell polyurethane foam. The medium 70 is installed in a generally cylindrical housing 72 secured to the lower end of the piston rod 32. As shown in FIG. 1, the housing 72 can be concentrically mounted about the piston rod 32 and welded and sealed at a reduced-diameter portion 74. An upper annular flange 76 can serve as a seat for a conventional bump stop 78. An annular inlet 80 is provided at the lower end of the housing 72.

An orifice plate 82 is retained at the inlet 80 by crimping a portion of the housing 72 as illustrated best in FIG. 2. A plurality of openings 84 are provided in the orifice plate 82 about the piston rod 32. A plurality of flexible valve disks 86 are mounted on inner and outer annular seats 88, 90 formed on an upper surface of the orifice plate 82. A coil spring 92 is seated on the upper valve disk 86 and held in place by an indentation 94 formed in the housing 72. An O-ring seal 96 is held in place by a retainer 98 to provide a hydraulic seal between the orifice plate 82 and the piston rod 32.

When the solenoid valve assembly 60 is closed, increased fluid pressure in the upper chamber 26 causes fluid to enter the openings 84 of the orifice plate 82 and deflect the valve disks 86 upwardly away from the outer seat 90. Fluid entering the housing 72 compresses the medium 70.

When the pressure rise in the upper chamber 26 dissipates, fluid is metered to the upper chamber 26 through a coined portion 100 on the inner seat 88 as indicated by arrows 102 in FIG. 2. Fluid in the housing 72 is forced through coined portion 100 as the medium 70 expands.

The medium 70 may be preloaded to set the minimum fluid pressure level at which the accumulator 68 becomes active in the hydraulic circuit. In practice, the preload may be set so that full damping force in instantaneously available at low damper velocities where momentum effects are not objectionable.

Various aspects of the accumulator 68 may be adjusted to satisfy the requirements of a particular damper. For example, the volume, the damping coefficient and the preload of the compressible medium 70 can be varied to achieve a desired result. Additionally, the metering of fluid into and out of the accumulator 68 can be selectively adjusted.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. An adjustable automotive suspension damper comprising:
   (a) a fluid-filled inner cylinder;
   (b) a piston, slidably mounted in the inner cylinder, dividing an interior of the inner cylinder into first and second chambers;
   (c) a reciprocating piston rod secured at one end to the piston;
   (d) a valving assembly mounted on the piston for controlling fluid flow between the first and second chambers;
   (e) a reservoir formed between the inner cylinder and a reservoir tube for receiving fluid flow from the second chamber as the piston slides in the inner cylinder;
   (f) a compression valving assembly mounted at one end of the inner cylinder for controlling fluid flow between the second chamber and the reservoir;
   (g) a bypass channel formed between the inner cylinder and an intermediate tube concentrically mounted between the inner cylinder and the reservoir tube for bypassing fluid from the first chamber to the reservoir;
   (h) a solenoid valve assembly mounted on the reservoir tube in fluid communication with the bypass channel and the reservoir, wherein energization of the solenoid valve assembly permits fluid flow from the first chamber to the reservoir; and
   (i) accumulator means mounted on the piston rod in the first chamber for storing and dissipating energy resulting from a fluid pressure rise in the first chamber of the inner cylinder caused by closure of the solenoid valve assembly to reduce transmission of noise, the accumulator means including
      (i) a housing concentrically mounted about the piston rod in the first chamber of the inner cylinder having an inlet at one end and being sealed at an opposite end so that an interior chamber is provided between the housing and the piston rod, (ii) a compressible medium housed in the interior chamber between the housing and the piston rod, and (iii) accumulator valving means for controlling fluid flow through the inlet end of the housing including an orifice plate, concentrically mounted on the piston rod, having a plurality of openings provided about the piston rod, and deflectable disk means, seated on the orifice plate, covering the orifice plate openings.

2. The suspension damper specified in claim 1 wherein the medium is formed from closed-cell polyurethane foam.

3. The suspension damper specified in claim 1 including a bump stop mounted on the housing.

4. The suspension damper specified in claim 1 wherein the deflectable disk means includes a plurality of preloaded deflectable disks.

5. The suspension damper specified in claim 1 including seal means between the orifice member and the piston rod.

6. The suspension damper specified in claim 1 including means for preloading the deflectable disk means.

7. The suspension damper specified in claim 6 wherein the means for preloading the deflectable disk means includes spring means.

8. The suspension damper specified in claim 7 wherein the spring means includes the one end of a spring is seated on an uppermost disk and an opposite end of the spring is retained by an indentation formed in the housing.

9. The suspension damper specified in claim 1 wherein the deflectable disk means are seated on a coined seat of the orifice plate.

* * * * *